US012774909B2

(12) United States Patent
Bertsch et al.

(10) Patent No.: US 12,774,909 B2
(45) Date of Patent: Oct. 27, 2026

(54) DETECTION OF A MISSING OR FAULTY SENSOR CONFIGURATION WHEN CONNECTING A SENSOR TO A TRANSMITTER

(71) Applicant: Endress+Hauser Conducta GmbH+Co. KG, Gerlingen (DE)

(72) Inventors: Benjamin Bertsch, Gerlingen (DE); Martin Lohmann, Gerlingen (DE); Eckhard Sommer, Sternenfels (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 543 days.

(21) Appl. No.: 18/344,351

(22) Filed: Jun. 29, 2023

(65) Prior Publication Data

US 2024/0003720 A1 Jan. 4, 2024

(30) Foreign Application Priority Data

Jul. 1, 2022 (DE) ..................... 10 2022 116 539.6

(51) Int. Cl.
*G01D 18/00* (2006.01)
*G01D 3/08* (2006.01)
(Continued)

(52) U.S. Cl.
CPC ............. *G01D 18/00* (2013.01); *G08B 21/18* (2013.01); *G01D 3/08* (2013.01); *G01D 21/00* (2013.01)

(58) Field of Classification Search
CPC .......... G01D 18/00; G01D 3/08; G01D 21/00; G01D 21/18; G08B 21/18
See application file for complete search history.

(56) References Cited

U.S. PATENT DOCUMENTS

2015/0123815 A1* 5/2015 Mejegard ............... G06Q 10/06 340/870.07
2018/0164130 A1* 6/2018 Robl .................. G06F 9/45508
2022/0170768 A1* 6/2022 Hilsendegen ........... H04W 4/38

FOREIGN PATENT DOCUMENTS

DE 7404312 U 5/1974
DE 102008042972 A1 4/2010
(Continued)

OTHER PUBLICATIONS

Wikipedia ("Highway Addressable Remote Transducer Protocol." Wikipedia, The Free Encyclopedia. Wikipedia, The Free Encyclopedia, Jun. 13, 2022) (Year: 2022).*

*Primary Examiner* — Christian T Bryant
(74) *Attorney, Agent, or Firm* — Mark A. Logan; Endress+Hauser (USA) Holding, Inc.

(57) ABSTRACT

A method in a transmitter-sensor system for detection of a missing or faulty sensor configuration when connecting a sensor to a transmitter, comprises: retrieving first information concerning the transmitter by the sensor from the transmitter; checking by an electronics of the sensor, whether second information concerning the transmitter is stored in a memory unit of the sensor; when the second information concerning the transmitter is stored in the memory unit of the sensor: retrieving the second information concerning the transmitter by the electronics of the sensor, and comparing the first information concerning the transmitter with the second information concerning the transmitter; and informing a user when the first information differs from the second information or when no second information is stored in the memory unit of the sensor. Disclosed also is a sensor and a transmitter.

10 Claims, 1 Drawing Sheet

(51) Int. Cl.

| | |
|---|---|
| ***G01D 21/00*** | (2006.01) |
| ***G08B 21/18*** | (2006.01) |

(56) References Cited

FOREIGN PATENT DOCUMENTS

| | | | |
|---|---|---|---|
| DE | 102019135484 | A1 | 6/2021 |
| DE | 102020112823 | A1 | 11/2021 |
| DE | 102020120456 | A1 | 2/2022 |
| EP | 2613462 | B1 | 9/2017 |
| WO | 2009025842 | A1 | 2/2009 |

* cited by examiner

DETECTION OF A MISSING OR FAULTY SENSOR CONFIGURATION WHEN CONNECTING A SENSOR TO A TRANSMITTER

CROSS-REFERENCE TO RELATED APPLICATION

The present application is related to and claims the priority benefit of German Patent Application No. 10 2022 116 539.6, filed on Jul. 1, 2022, the entire contents of which are incorporated herein by reference.

TECHNICAL FIELD

The present disclosure relates to a first method for detection of a missing or faulty sensor configuration when connecting a sensor to a transmitter. Furthermore, the present disclosure relates to a second method for detection of a missing or faulty sensor configuration when connecting a sensor to a transmitter. Furthermore, the present disclosure relates to a first transmitter-sensor system. Furthermore, the present disclosure relates to a second transmitter-sensor system. Furthermore, the present disclosure relates to a sensor. Finally, the present disclosure relates to a transmitter.

BACKGROUND

In process industrial applications, a wide variety of process measured values are ascertained for controlling and checking various processes. Examples of such process measured values include, for example, temperature, pressure, fill level, flow, pH value, conductivity, and the like These process measured values are ascertained at certain measuring points in the process flow. A measuring point is composed, as a rule, of a combination of different devices. In such case, different measuring devices (hereinafter called sensors) are combined with various display-, evaluation- and configuration devices (hereinafter called transmitters) to form a measuring point. The connection for data exchange between sensor and transmitter occurs, in such case, via an interface, hereinafter called the sensor port.

For a correct fulfillment of the measuring task, a configuration of the sensors can be necessary. In such case, as a rule, different parameters of the sensors or the transmitters are adapted by user input to the conditions of the measuring point.

A configuration is always necessary, when a brand-new sensor is taken into operation at a measuring point and, consequently, no configuration is present, or a sensor previously operated at another measuring point is connected with a new measuring point. Also, in such case, no configuration of the sensor is present.

To this point in time, a detecting whether a sensor was configured for a measuring point has not been possible. Therefore, the user cannot be pointed to a necessary configuration of a sensor. In such case, necessary configurations can be forgotten. A missing configuration can lead to serious errors in the conduct of a process.

An option would be to have the system inform a user basically every time that a sensor is connected that a configuration adapting might be necessary. This approach is, however, very error susceptible and means additional effort for the customers.

SUMMARY

Starting from the above described problems, an object of the present disclosure is to detect whether a configuration is already present for a sensor or whether the configuration is in order.

As regards the first method, it is provided that such serves for detection of a missing or faulty sensor configuration when connecting a sensor to a transmitter, wherein the sensor is connected to a sensor port of the transmitter and is in communication connection with the transmitter, wherein the first method comprises method steps as follows:

- retrieving first information concerning the transmitter by the sensor from the transmitter, wherein the first information concerning the transmitter includes a number of the sensor port of the transmitter to which the sensor is connected and identification information of the transmitter;
- checking by an electronics of the sensor whether second information concerning the transmitter is stored in a memory unit of the sensor, wherein the second information concerning the transmitter includes a number of a sensor port and an identification of a transmitter,
- in the case in which second information concerning the transmitter is stored in the memory unit of the sensor:
  - i. retrieving the second information concerning the transmitter by the electronics of the sensor, and
  - ii. comparing the first information concerning the transmitter with the second information concerning the transmitter; and
- informing a user in case the first information concerning the transmitter differs from the second information concerning the transmitter or in case no second information concerning the transmitter is stored in the memory unit of the sensor.

According to the present disclosure, the sensor detects, thus, whether a configuration for the measuring point is present for it. This is accomplished in that sensors, which are connected and operated with a transmitter, retrieve from the transmitter first information, which especially contains the serial number of the transmitter and a sensor port to which they are connected. This information is stored in the sensor as second information. If a sensor is disconnected from a transmitter, then the second information remains stored in the sensor.

If this sensor is connected anew with a transmitter, the sensor compares the first information with the stored, second information. If no agreement is detected, a change of the configuration parameters is assumed. If no second information is stored in the memory unit of the sensor, it is then assumed therefrom that this is the first use of the sensor, such that no configuration for the sensor is present.

By means of the first method of the present disclosure, an increased operating safety of customer processes is assured.

As regards the second method, is provided that such serves for detection of a missing or faulty sensor configuration when connecting a sensor to a transmitter, wherein the sensor is connected to a sensor port of the transmitter and is in communication connection with the transmitter, wherein the second method comprises method steps as follows:

- retrieving first information concerning the sensor by the transmitter from the sensor, wherein the first information concerning the sensor includes a number of the sensor port of the transmitter, to which the sensor is connected, and identification information of the sensor;
- checking by an electronics of the transmitter, whether second information concerning the sensor is stored in a memory unit of the transmitter, wherein the second information concerning the sensor includes a number of a sensor port, to which the sensor is connected, and an identification of a sensor, in the case, in which second information concerning the sensor is stored in the memory unit of the transmitter:

i. retrieving the second information concerning the sensor by the electronics of the transmitter, and ii. comparing the first information concerning the sensor with the second information concerning the sensor; and informing a user, in case the first information concerning the sensor differs from the second information concerning the sensor or in case no second information concerning the sensor is stored in the memory unit of the transmitter.

The second method corresponds, in principle, to the first method. It differs from the first method, however, in that not the sensor retrieves the first information from the transmitter, but, instead, that the transmitter contains the first information (in this case the identification information of the sensor and information concerning which sensor port the sensor was connected to). The transmitter (and not the sensor such as in the first method) then compares the retrieved first information with a second information stored in a memory unit of the transmitter.

Also by means of the second method of the present disclosure, an increased operating safety of customer processes is assured.

In an advantageous embodiment of the first or second method of the present disclosure, it is provided that after the step of retrieving the second information concerning the transmitter, or the sensor, or after the step of comparing the first information concerning the transmitter, or the sensor, with the second information concerning the transmitter, or the sensor, the second information stored in the memory unit concerning the transmitter, or the sensor, is replaced with first information concerning the transmitter, or the sensor. It can, alternatively, also be provided that a plurality of second informations is stored in a memory unit and a new second information is stored supplementally in the memory unit without requiring that existing data be overwritten.

In an advantageous embodiment of the first or second method of the present disclosure, it is provided that the method is repeated from the method step of retrieving the first information concerning the transmitter, or the sensor, when the sensor or the transmitter is switched on anew, when the sensor is connected with another transmitter or when another sensor is connected with the transmitter. Simply stated, the method is always performed when a (new-)connection between a sensor and a transmitter is established.

In an advantageous embodiment of the first or second method of the present disclosure, it is provided that the identification information contained in the first information concerning the transmitter, or the sensor, and/or contained in the second information concerning the transmitter, or the sensor, is a serial number of the corresponding transmitter, or sensor.

As regards the first transmitter-sensor system, it is provided that such comprises:

A transmitter having at least one sensor port for connecting a sensor;

a sensor comprising: an interface for connecting to a sensor port of a transmitter; a memory, in which second information concerning a transmitter is storable, wherein the second information concerning the transmitter includes a number of a sensor port and an identification of a transmitter; and an electronics, wherein the electronics of the sensor is embodied:

to retrieve first information concerning the transmitter from the transmitter, wherein the first information concerning the transmitter includes a number of the sensor port of the transmitter, to which the sensor is connected, and identification information of the transmitter;

to check whether second information concerning the transmitter is stored in the memory unit of the sensor, in the case, in which second information concerning the transmitter is stored in the memory unit of the sensor:

i. to retrieve the second information concerning the transmitter from the memory unit of the sensor, and ii. to compare the first information concerning the transmitter with the second information concerning the transmitter; and to inform a user, in case the first information concerning the transmitter differs from the second information concerning the transmitter or in case no second information concerning the transmitter is stored in the memory unit of the sensor.

As regards the second transmitter-sensor system, it is provided that such comprises:

A sensor having an interface for connecting to a sensor port of a transmitter, a transmitter comprising: at least one sensor port for connecting a sensor; a memory, in which second information concerning a sensor is storable, wherein the second information includes a number of a sensor port, to which the sensor is connected, and an identification of a sensor; and an electronics, wherein the electronics of the transmitter is embodied:

to retrieve first information concerning the sensor from the sensor, wherein the first information concerning the sensor includes a number of the sensor port of the transmitter, to which the sensor is connected, and identification information of the sensor;

to check whether second information concerning the sensor is stored in the memory unit of the transmitter, in the case, in which second information concerning the sensor is stored in the memory unit of the transmitter:

i. to retrieve the second information concerning the sensor from the memory unit of the transmitter, and ii. to compare the first information concerning the sensor with the second information concerning the sensor; and to inform a user, in case the first information concerning the sensor differs from the second information concerning the sensor or in case no second information concerning the sensor is stored in the memory unit of the transmitter.

In an advantageous embodiment of the first or second transmitter-sensor system of the present disclosure, it is provided that the electronics of the sensor, or of the transmitter, is embodied after retrieving the second information concerning the transmitter, or the sensor, or after comparing the first information with the second information concerning the transmitter, or the sensor, to replace the second information stored in the corresponding memory unit of the sensor, or of the transmitter, concerning the transmitter, or the sensor, with first information concerning the transmitter, or the sensor. It can, alternatively, also be provided that a plurality of second informations is stored in the memory unit and a new second information is stored supplementally in the memory unit, without requiring that existing data be overwritten.

In an advantageous embodiment of the first or second transmitter-sensor system of the present disclosure, it is provided that the electronics of the sensor, or of the transmitter, is embodied to repeat the retrieving of the first information concerning the transmitter, or the sensor, and subsequent steps, when the sensor or the transmitter is switched on anew or when the sensor is connected with another transmitter. Simply stated, the method is always performed, when a (new-)connection between sensor and transmitter is established.

In an advantageous embodiment of the first transmitter-sensor system of the present disclosure, it is provided that the electronics of the sensor is embodied to transmit a warning signal or warning telegram to the transmitter in case the first information concerning the transmitter differs from the second information concerning the transmitter or in case no second information concerning the transmitter is stored in the memory unit of the transmitter.

In an advantageous embodiment of the second transmitter-sensor system of the present disclosure, it is provided that the electronics of the transmitter is embodied to generate a warning signal, in case the first information concerning the sensor differs from the second information concerning the sensor or in case no second information concerning the sensor is stored in the memory unit of the transmitter.

In an advantageous, further development, the transmitter includes a display unit, wherein the transmitter is embodied after receipt or generating of the warning signal or of the warning telegram to output a notification or warning report via the display unit. The display unit in the simplest case is a lamp or LED, which, for example, lights up, when the warning signal, or warning telegram, is received. The display unit can, however, also be a display, in the case of which the notification or warning report is shown as a symbol and/or text report.

In an advantageous, further development, the system further includes a network device or a service or operating device, wherein the network device, or the service or operating device, is in communication connection with the transmitter via a wire or wireless connection, wherein the transmitter is embodied upon receipt or generating of the warning signal or of the warning telegram, to transmit the warning signal, or the warning telegram, to the network device, or to the service or operating device. The term "network device" is, in such case, to be broadly constructed. Thus, the network device can be an additional transmitter, or a superordinated unit (for example, a control unit, for example, a PLC), or a service or operating device or a mobile end device, or a PC, or a device of the control station, or a cloud contactable via the Internet, or the like.

As regards the sensor of the present disclosure, it is provided that such comprises:

- an interface for connecting to a sensor port of a transmitter,
- a memory in which second information concerning the transmitter is storable, wherein the second information includes a number of a sensor port and an identification of a transmitter, and
- an electronics, wherein the electronics of the sensor is embodied:
  - to check whether second information concerning the transmitter is stored in the memory unit of the sensor,
  - in the case, in which second information concerning the transmitter is stored in the memory unit of the sensor:
    - i. to retrieve the second information concerning the transmitter from the memory unit of the sensor, and
    - ii. to compare the second information concerning the transmitter with first information concerning the transmitter, wherein the first information includes a number of a sensor port of the transmitter, and identification information of the transmitter; and
  - to inform a user, in case the first information concerning the transmitter differs from the second information concerning the transmitter or in case no second information concerning the transmitter is stored in the memory unit of the sensor.

As regards the transmitter of the present disclosure, it is provided that such comprises:

- at least one sensor port for connecting a sensor,
- a memory in which second information concerning the sensor is storable, wherein the second information includes a number of a sensor port to which the sensor is or was connected, and an identification of a sensor,
- an electronics, wherein the electronics is embodied:
  - to check whether second information concerning the sensor is stored in the memory unit of the transmitter,
  - in the case in which second information concerning the sensor is stored in the memory unit of the transmitter:
    - i. to retrieve the second information concerning the sensor from the memory unit of the transmitter, and
    - ii. to compare the second information concerning the sensor with first information concerning the sensor, wherein the first information concerning the sensor includes a number of a sensor port of the transmitter, to which the sensor is connected, and identification information of the sensor; and
  - to inform a user, in case the first information concerning the sensor differs from the second information concerning the sensor or in case no second information concerning the sensor is stored in the memory unit of the transmitter.

BRIEF DESCRIPTION OF THE DRAWINGS

The present disclosure will now be explained in greater detail based on the appended drawing, the figures of which show as follows.

DETAILED DESCRIPTION

Figure 1:
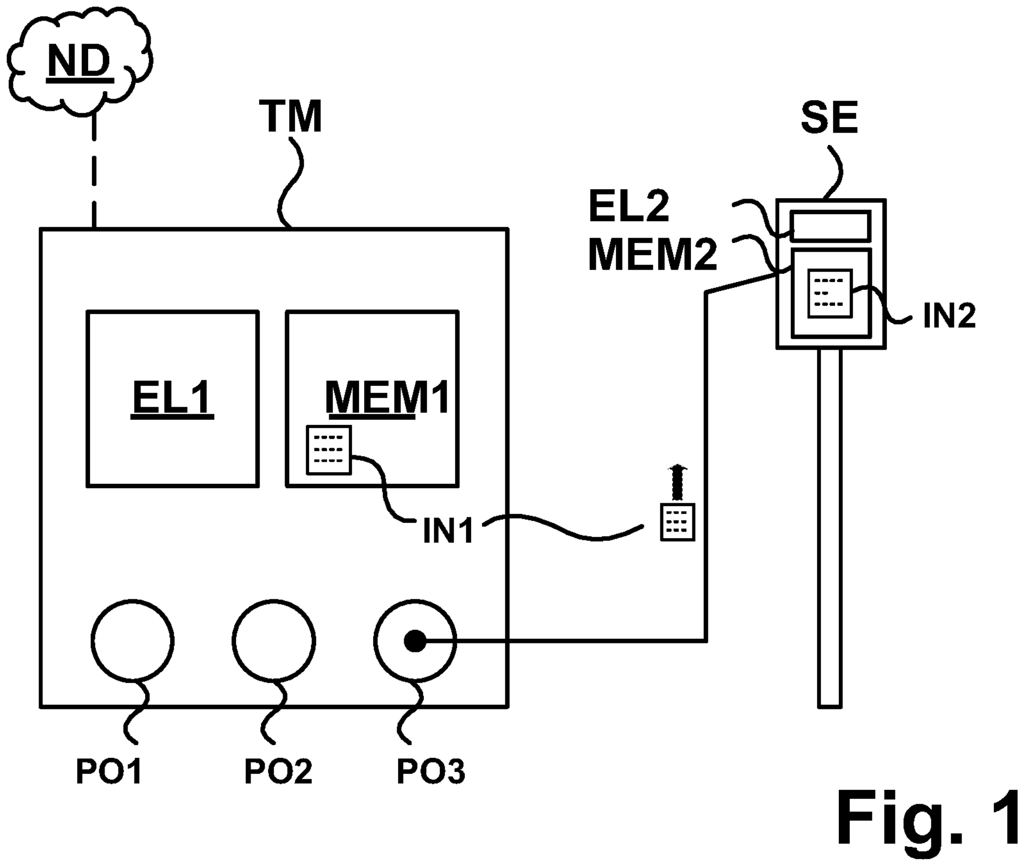
FIG. 1 shows a schematic view of a first example of an embodiment of the method of the present disclosure.

FIG. 1 shows a sensor SE, which is connected to a transmitter TM. The sensor is, for example, a probe for measuring the pH- and conductivity value of a medium. It can be any other sensor type. The sensor is embodied to obtain raw measurement data and to transmit such via a communication connection to the transmitter TM. The transmitter TM serves to process the raw measurement data further.

The connection in the present case is implemented by wire. The sensor SE is connected for this to a sensor port PO3 of the transmitter TM. In order that the transmitter TM can correctly process the raw measurement data of the sensor SE, a configuration needs to be present. The sensor checks, as set forth below, whether a configuration already exists, thus, whether sensor SE and transmitter TM already know one another.

After connection with the transmitter TM, the sensor SE retrieves first information IN1 concerning the transmitter TM from the transmitter TM. This first information IN1 is stored in a memory unit MEM1 of the transmitter TM and includes identification information of the transmitter TM, as well as the number of the sensor port SP3 to which the sensor SE is connected.

After retrieving the first information IN1, an electronics EL2 of the sensor SE checks whether information relative to the transmitter TM is already stored in a memory unit MEM2 of the sensor. In case yes, the electronics EL2 compares the information IN1, IN2 with one another. If the information IN1, IN2 is identical, then transmitter TM and sensor SE know one another, thus a configuration is present.

If the two sets of information IN1, IN2 are not identical (because, for example, a new sensor was connected) or no second information is present in the memory unit MEM2, then the electronics EL2 creates a warning signal or warning telegram and transmits such to the transmitter TM.

In the present case, the transmitter TM is connected via the Internet with a network device ND, which is, for example, a cloud platform. The transmitter TM transmits the warning signal, or warning telegram, to the network device ND, via which the user is informed of the missing configuration.

Figure 2:
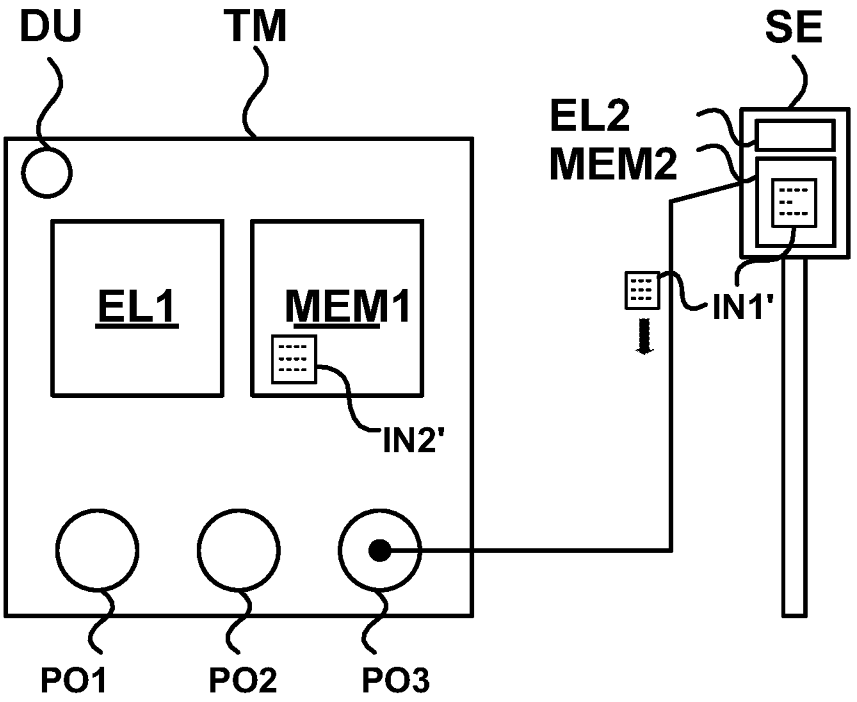
FIG. 2 shows a schematic view of a second example of an embodiment of the method of the present disclosure.

In the example of an embodiment shown in FIG. 2, the transmitter TM assumes the role of retriever. After connection with the sensor SE, the transmitter retrieves first information IN1' relative to the sensor SE from the sensor SE. This first information INF is stored in a memory unit MEM2 of the sensor SE and includes identification information of the sensor SE, as well as the number of the sensor port PO3 of the transmitter TM, to which the sensor SE is connected.

After retrieving the first information IN1', an electronics EL1 of the transmitter checks whether information relative to the sensor SE is already stored in the memory unit MEM1 of the transmitter TM. In case yes, the electronics EL1 compares the two sets of information INF, INT with one another. If the two sets of information IN1', INT are identical, then transmitter TM and sensor SE know one another, thus a configuration is present.

If the two sets of information INF, INT are not identical (because, for example, a new sensor was connected) or there is no second information INT in the memory unit MEM1, then the electronics EL1 creates a warning signal or warning telegram.

In the present case, the transmitter TM includes a display unit DU in the form of a light emitting element, which signals the warning signal to the user by lighting up. The display unit DU can, however, also be a display showing the warning signal, or the warning telegram.

Many other embodiments can exist, in which different aspects of the two shown examples of embodiments are included. For example, also the transmitter shown in FIG. 2 can be connected with the network device ND and can transmit the warning signal, or the warning telegram, to such.

The invention claimed is:

1. A transmitter-sensor system for an industrial process application, comprising the transmitter, including:

at least one sensor port for connecting the sensor; and an electronics including a memory, wherein the transmitter is configured to process raw measurement data of the sensor according to sensor configuration data stored in the memory of the transmitter; and the sensor, including:

an element for determining the raw measurement data of a process measured value, wherein the process measured value includes a temperature, a pressure, a fill level, a flow, a pH value, or a conductivity;

an interface for connecting to the at least one sensor port of the transmitter;

a memory unit in which second information concerning the transmitter is storable, wherein the second information concerning the transmitter includes a number of the at least one sensor port to which the sensor is connected and an identification of a transmitter; and an electronics, wherein the electronics of the sensor is embodied to:

retrieve first information concerning the transmitter from the transmitter, wherein the first information concerning the transmitter includes a number of the at least one sensor port of the transmitter to which the sensor is connected and identification information of the transmitter;

check whether the second information concerning the transmitter is stored in the memory unit of the sensor;

when the second information concerning the transmitter is stored in the memory unit of the sensor:

retrieve the second information concerning the transmitter from the memory unit of the sensor; and compare the first information concerning the transmitter with the second information concerning the transmitter; and inform a user when the first information concerning the transmitter differs from the second information concerning the transmitter or when no second information concerning the transmitter is stored in the memory unit of the sensor.

2. The transmitter-sensor system as claimed in claim 1, wherein the electronics of the sensor is further embodied, after retrieving the second information concerning the transmitter, or after comparing the first information with the second information concerning the transmitter, to replace the second information concerning the transmitter stored in the memory unit of the sensor with first information concerning the transmitter.

3. The transmitter-sensor system as claimed in claim 1, wherein the electronics of the sensor is further embodied to repeat the retrieving of the first information concerning the transmitter and subsequent steps when the sensor or the transmitter is switched on anew or when the sensor is connected with another transmitter.

4. The transmitter-sensor system as claimed in claim 1, wherein the electronics of the sensor is further embodied to transmit a warning signal or warning telegram to the transmitter when the first information concerning the transmitter differs from the second information concerning the transmitter or in case no second information concerning the transmitter is stored in the memory unit of the sensor.

5. The transmitter-sensor system as claimed in claim 4, wherein the transmitter further includes a display unit, wherein the transmitter is embodied after receipt or generating of the warning signal or of the warning telegram to output a notification or warning report via the display unit.

6. The transmitter-sensor system as claimed in claim 4, further comprising a network device or a service or operating device, wherein the network device, or the service or operating device is in communication connection with the transmitter via a wire or wireless connection, wherein the transmitter is embodied, upon receipt or generating of the warning signal or of the warning telegram, to transmit the warning signal, or the warning telegram, to the network device or to the service or operating device.

7. A transmitter-sensor system for an industrial process application, comprising:

the sensor, including:

an element for determining raw measurement data of a process measured value, wherein the process measured value includes a temperature, a pressure, a fill level, a flow, a pH value, or a conductivity;

an electronics including a memory; and an interface for connecting to at least one sensor port of the transmitter;

the transmitter, including:

the at least one sensor port for connecting a sensor;

a memory unit in which second information concerning the sensor is storable, wherein the second information includes a number of the at least one sensor port to which the sensor is connected, and an identification of a sensor; and an electronics, wherein the electronics of the transmitter is embodied to:

process the raw measurement data of the sensor according to sensor configuration data stored in the memory unit of the transmitter retrieve first information concerning the sensor from the sensor, wherein the first information concerning the sensor includes a number of the at least one sensor port of the transmitter to which the sensor is connected, and identification information of the sensor;

check whether second information concerning the sensor is stored in the memory unit of the transmitter; and when the second information concerning the sensor is stored in the memory unit of the transmitter:

retrieve the second information concerning the sensor from the memory unit of the transmitter; and compare the first information concerning the sensor with the second information concerning the sensor; and inform a user when the first information concerning the sensor differs from the second information concerning the sensor or when no second information concerning the sensor is stored in the memory unit of the transmitter.

8. The transmitter-sensor system as claimed in claim 7, wherein the electronics of the transmitter is further embodied after retrieving the second information concerning the sensor, or after comparing the first information with the second information concerning the sensor, to replace the second information concerning the sensor stored in the memory unit of the transmitter with first information concerning the sensor.

9. The transmitter-sensor system as claimed in claim 7, wherein the electronics of the transmitter is further embodied to repeat the retrieving of the first information concerning the sensor and subsequent steps when the sensor or the transmitter is switched on anew or when the sensor is connected with another transmitter.

10. The transmitter-sensor system as claimed in claim 7, wherein the electronics of the transmitter is further embodied to generate a warning signal when the first information concerning the sensor differs from the second information concerning the sensor or when no second information concerning the sensor is stored in the memory unit of the transmitter.

* * * * *